United States Patent

Olds et al.

Patent Number: 5,867,789
Date of Patent: Feb. 2, 1999

[54] METHOD AND SYSTEM FOR REAL-TIME CHANNEL MANAGEMENT IN A RADIO TELECOMMUNICATIONS SYSTEM

[75] Inventors: Keith Andrew Olds, Mesa, Ariz.; Gerald Joseph Davieau, Eldersburg, Md.

[73] Assignee: Motorola, Inc., Schaumburg, Ill.

[21] Appl. No.: 777,434

[22] Filed: Dec. 30, 1996

[51] Int. Cl.$^6$ .................................. H04Q 7/30
[52] U.S. Cl. ..................... 455/453; 455/12.1; 455/63; 455/452
[58] Field of Search ................... 455/450, 452, 455/453, 62, 63, 442, 443, 446, 447, 448, 449, 509, 512, 12.1, 436

[56] References Cited

U.S. PATENT DOCUMENTS

| | | | |
|---|---|---|---|
| 4,670,899 | 6/1987 | Brody et al. | 455/453 |
| 5,301,356 | 4/1994 | Bodin et al. | 455/512 |
| 5,530,917 | 6/1996 | Andersson et al. | 455/450 |
| 5,608,780 | 3/1997 | Gerszberg et al. | 455/450 |
| 5,697,059 | 12/1997 | Carney | 455/62 |

FOREIGN PATENT DOCUMENTS 615395A  1/1994  European Pat. Off. ......... H04Q 7/04

*Primary Examiner*—Reinhard J. Eisenzopf
*Assistant Examiner*—Lester G. Kincaid
*Attorney, Agent, or Firm*—Frank J. Bogacz; Harold C. McGurk, IV

[57] ABSTRACT

A channel management process (68) is performed by a parent base station (36) of a radio telecommunications system (20) that exchanges channel usage data with neighbor base stations (38) within its local group (34). When channel usage data indicates a channel assignment conflict, that conflict is resolved in the base station (22) having the lesser loading of the pair of conflicting base stations (22). Channel usage requests received by a base station (22) are prioritized and sequentially processed, channels (58) being assigned for inter-cell handoff requests, then intra-cell handoff requests after inter-cell handoff requests, even when that assignment creates a conflict, and then channels (58) being assigned to new call requests after handoff requests if that assignment does not create a conflict.

26 Claims, 8 Drawing Sheets

| BASE STATION | | LOADING INDEX | REUSE UNITS | | | | | | | | |
|---|---|---|---|---|---|---|---|---|---|---|---|
| PARENT | 0 | 1587 | | | | | | | | | ... |
| NEIGHBORS | 1 | 0142 | | | | | | | | | ... |
| | 2 | 2649 | | | | | | | | | ... |
| | 3 | 0972 | | | | | | | | | ... |
| | 4 | 1377 | | | | | | | | | ... |
| | 5 | 0892 | | | | | | | | | ... |
| | 6 | 1925 | | | | | | | | | ... |
| | 7 | 1447 | | | | | | | | | ... |
| | 8 | 0463 | | | | | | | | | ... |
| | ... | ... | ... | ... | ... | ... | ... | ... | ... | ... | ... |

METHOD AND SYSTEM FOR REAL-TIME CHANNEL MANAGEMENT IN A RADIO TELECOMMUNICATIONS SYSTEM

FIELD OF THE INVENTION

The present invention relates to radio telecommunication systems. More specifically, the present invention relates to subscriber channel allocation and conflict resolution within radio telecommunication systems.

BACKGROUND OF THE INVENTION

In cellular telecommunication systems, a communication channel is generally assigned to a call in response to a channel usage request received by a base station, whether that request is initiated by a subscriber unit, by another base station, or within the original base station itself. Desirably, the assigned channel is selected so as not to cause interference or other conflict with other channels currently in use. This is not always possible.

When a channel usage conflict arises, each base station involved in the conflict attempts to resolve the conflict expeditiously. This creates two potential problems.

First, since a conflict by definition involves two base stations, each conflicting with the other, having both base stations attempt a resolution to the conflict creates redundant resolutions, and possibly creates other conflicts in the process. Only one of any given pair of base station need attempt a resolution. When the conflict has been resolved, it has been resolved for both base stations.

Second, having all base stations or even a "random-half" of base stations attempting conflict resolutions leads to potential excessive loading for those base stations that are already heavily loaded. Excessively loading a base station may cause that base station to fail to accept handoffs, drop calls, or perform some other unacceptable action.

What is needed is a system and method in which channel usage conflicts are avoided whenever possible. Whenever a channel usage conflict cannot be avoided, one or desirably more of the following should happen: 1) the conflict should be promptly resolved; 2) only one base station in the conflicting pair of base stations should attempt to resolve the conflict; and 3) the resolving base station in a pair of conflicting base stations should be that base station with the lesser workload.

BRIEF DESCRIPTION OF THE DRAWINGS

FIG. 6 depicts a representational local-group reuse-unit allocation table in accordance with a preferred embodiment of the present invention;

DETAILED DESCRIPTION OF THE DRAWINGS

Figure 1:
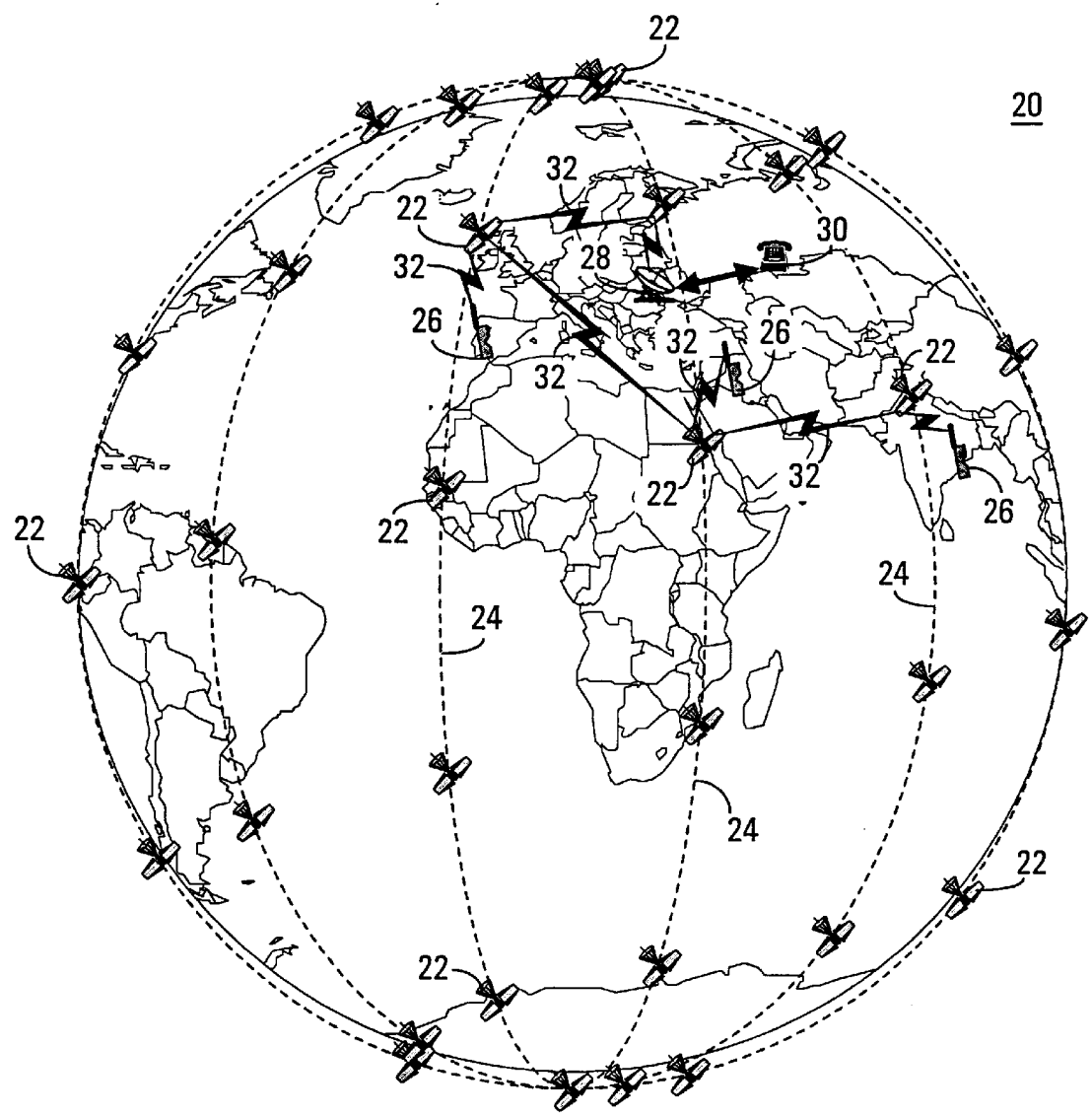
FIG. 1 depicts a highly simplified diagram of a global satellite cellular telecommunication system in accordance with a preferred embodiment of the present invention.

FIG. 1 depicts a highly simplified diagram of a global satellite cellular telecommunication system 20 in accordance with a preferred embodiment of the present invention. System 20 represents one form of a radio telecommunications system. In a typical system 20, base stations 22 are placed in orbit(s) 24 around earth or other celestial body. These base stations 22 then communicate with each other and with subscriber units 26, ground stations 28, and, through ground stations 28, land-based telephonic equipment 30.

In this embodiment, telecommunication base stations 22 for system 20 are realized as sixty-six satellites 22 placed in six low-earth polar orbits 24, eleven base stations 22 per orbit 24. Being low-earth orbits 24, with base stations 22 having an altitude of approximately 750 kilometers and an orbital velocity of approximately 25,000 kilometers per hour, orbits 24 are by definition moving orbits, as contrasted to geosynchronous (stationary) orbits. Being polar orbits 24, base stations 22 converge at the poles and diverge at the equator, creating a dynamic inter-satellite relationship. Those skilled in the art will appreciate that other numbers of satellites 22 in other numbers and types of orbits 24 may readily be used.

Each of base stations 22 communicates with its neighboring base stations 22, and with each subscriber unit 26 or ground station 28, in real time through data links 32. Ground stations 28 interface between system 20 and the multiplicity of land-based telephonic equipment 30. Each of base stations 22 comprises memory and a number of processors for storing and executing, respectively, the methods described herein and communication unit(s) for sending to and receiving data and/or information from adjacent base stations 22. Base stations 22 comprise other equipment for performing those functions normally attributed to a satellite in orbit around the earth. Memory, processors and communication units are well known and commercially available from a variety of vendors.

Using a combination of base stations 22 and/or ground stations 28 as intermediaries, a subscriber unit 28 located anywhere on earth may establish a call to and communicate with another subscriber unit 28, or with land-based telephonic equipment 30, located anywhere on or near the surface of the earth. In system 20, millions of such calls may be established and communicating simultaneously.

Figure 2:
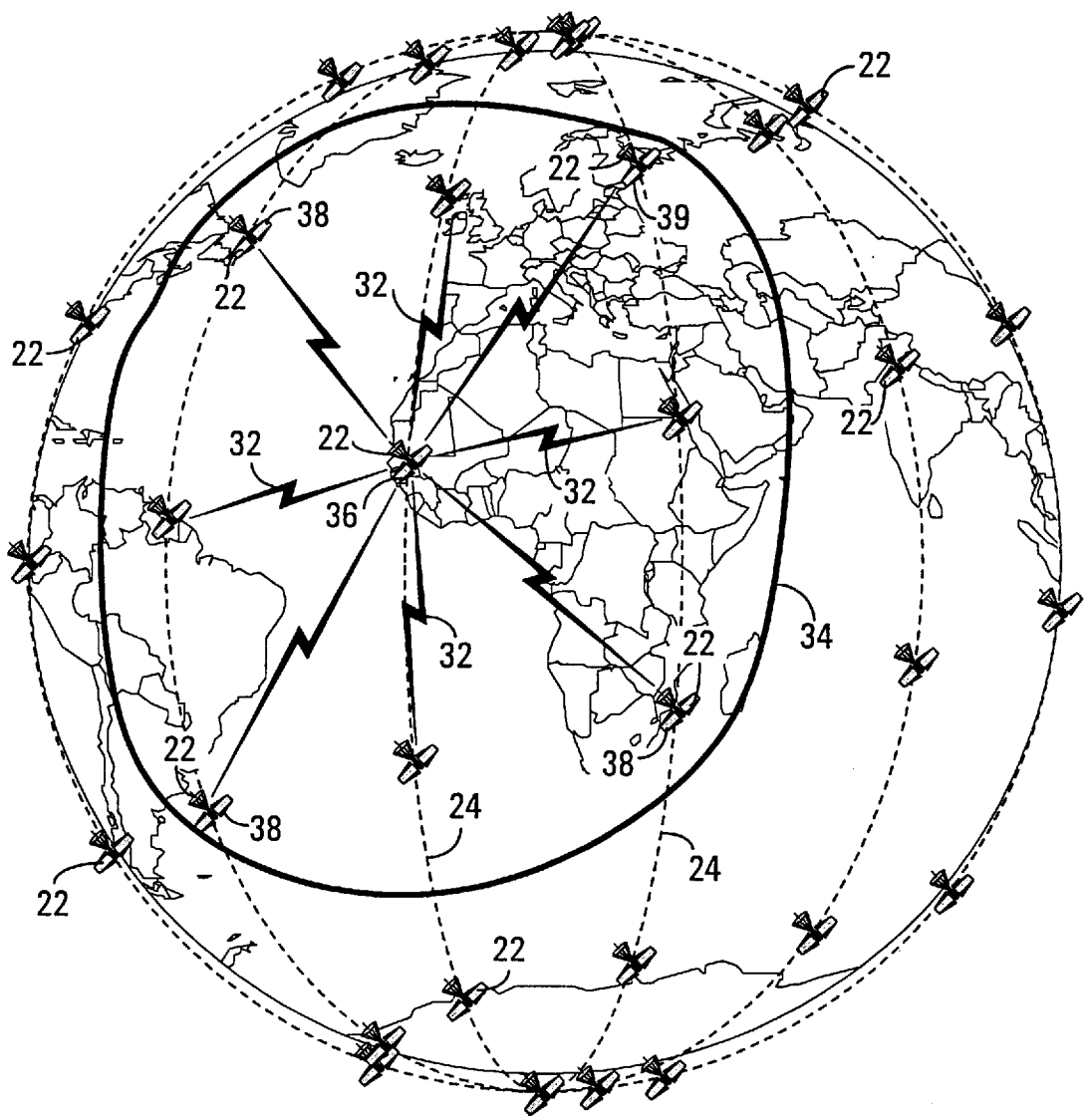
FIG. 2 depicts a simplified diagram of a local group of satellites in a global satellite cellular telecommunication system in accordance with a preferred embodiment of the present invention.

FIG. 2 depicts a simplified diagram of a local group 34 of satellites (base stations) 22 in a global satellite cellular telecommunication system 20 in accordance with a preferred embodiment of the present invention. A local group 34 is made up of a parent base station 36 and neighbor base stations 38 with which parent base station 36 has line-of-sight communications through data links 32. Base stations 22 outside of local group 34 have no direct communication with parent base station 36, but may communicate with parent base station 36 indirectly through other base stations 22.

Each base station 22 in system 20 is a parent base station 36 for its own local group 34. Therefore, each parent base station 36 is a neighbor base station 38 in the local group 34 in which its neighbor base station 38 is a parent base station 36.

Each parent base station 36 keeps its neighbor base stations 38 appraised of its current channel assignments. Because of this, and because each base station 22 is a parent base station 36 of its own local group 34, each parent base station 36 is also appraised of the current channel assignments of its neighbor base stations 38.

Since, in this embodiment of the present invention, each base station 22 is in a low-earth polar orbit 24, the number of base stations 22 in line-of-sight communications with a given base station 22 increases as that base station 22 approaches the poles and decreases as that base station 22 approaches the equator. Hence, the number of neighbor base stations 38 in the local group 34 of a given parent base station 36 may constantly change.

Figure 3:
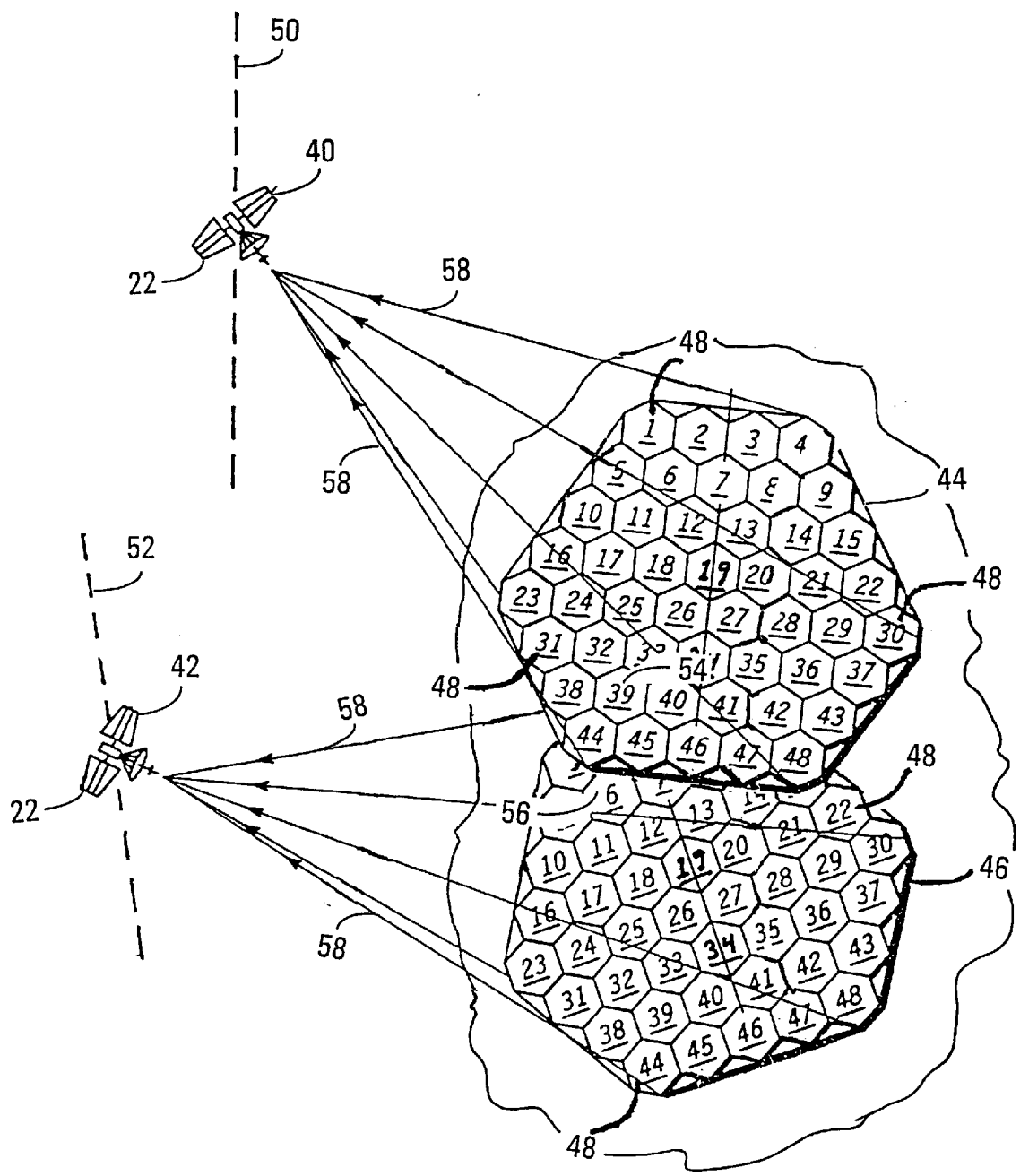
FIG. 3 depicts a schematic representation of a pair of base stations and their respective cellular footprints in accordance with a preferred embodiment of the present invention.

FIG. 3 depicts a schematic representation of a pair of base stations 22, referred to as base stations 40 and 42, and their respective cellular footprints 44 and 46 in accordance with a preferred embodiment of the present invention. Footprints 44 and 46 each contain a multiplicity of cells 48. In the example shown, there are 48 cells 48 in each footprint 44 or 46.

Base stations 40 and 42 are in adjacent low-earth polar orbits 50 and 52. This means that they converge as they approach the poles and diverge as they approach the equator. As base stations 40 and 42 converge, footprints 44 and 46 overlap and cells 48 that did not interfere will now interfere.

For example, a cell 54 (number 39) in footprint 44 did not interfere with a cell 56 (number 6) in footprint 46 prior to convergence. All communication channels 58 in cell 54 were non-interfering with regard to communication channels 58 in cell 56. As base stations 40 and 42 converge, footprints 44 and 46 begin to overlap and cell 54 approaches cell 56. At some point, channels 58 in cell 54 interfere with channels 58 in cell 56. When this occurs, a conflict resolution process, discussed later, resolves the conflict.

Figure 4:
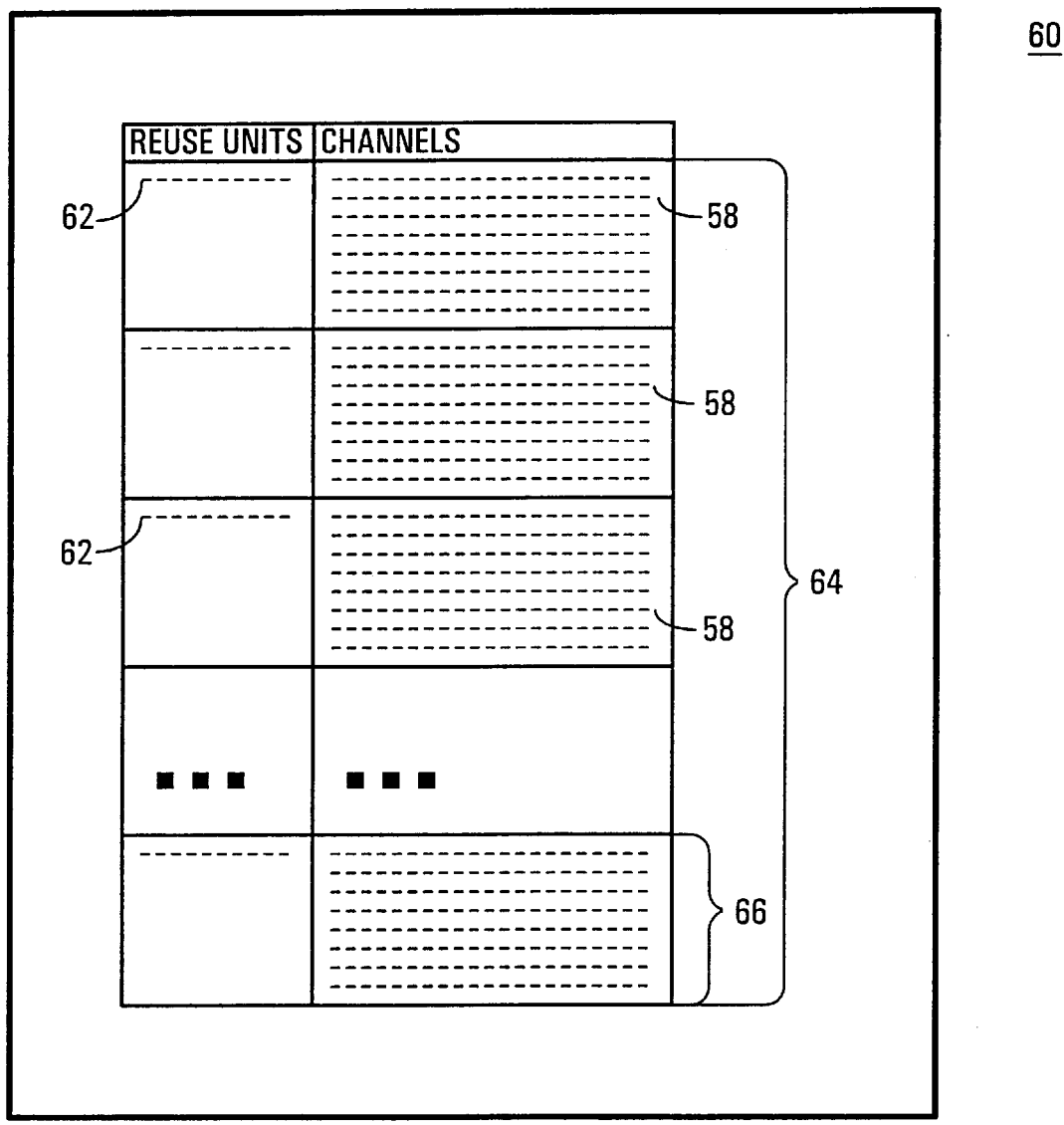
FIG. 4 depicts a chart indicating a relationship between reuse units and base stations in accordance with a preferred embodiment of the present invention.

FIG. 4 depicts a chart 60 indicating a relationship between reuse units 62 and communications channels 58 in accordance with a preferred embodiment of the present invention. A first plurality 64 of communications channels 58 are grouped into reuse units 62, each of which contains a second plurality 66 of channels 58. In the preferred embodiment, each reuse unit 62 contains eight channels 58. The use of reuse units 62 simplifies the management of channel assignments. Those skilled in the art may readily discern that reuse units 62 of other numbers of channels 58 are viable, including reuse units 62 containing only a single channel 58.

A reuse unit 62 is placed in use when a channel 58 it contains is placed in use, and is placed out of use when all channels 58 it contains are placed out of use. A channel 58 in an in-use reuse unit 62 may have one of three states; in-use, out-of-use but potentially interfering, or out-of use and non-interfering.

An in-use channel 58 is one that has already been assigned to a call at a particular location. An in-use channel is, therefore, not available for assignment in the vicinity of its use. That is, an in-use channel is not considered to be a free channel 58 in the vicinity of its use.

A conflict may arise with an in-use channel 58, e.g. through the convergence of base stations 22. The conflict is resolved through a process described later. Resolution of the conflict may or may not require the conflicting channel 58 to be placed out of use.

A potentially interfering out-of-use channel 58 is one that, while not assigned to a call, cannot be so assigned because placing it in-use would interfere with a channel 58 already in use nearby. An interfering out-of-use channel 58 is not available for assignment and is not a free channel 58.

A non-interfering out-of-use channel 58 is one that is out of use and, were it to be assigned to a call at a particular location, would not interfere with a channel 58 already in use near that location or elsewhere. Therefore, a non-interfering out-of-use channel 58 is available for use and is considered to be a free channel 58.

At base station 22, free channels 58 (FIG. 3) in in-use reuse units 62 are desirably placed in use before another reuse unit 62 is placed in use. Conversely, when the last in-use channel 58 in a reuse unit 62 is placed out of use, reuse unit 62 is placed out of use and returned to a general pool of reuse units 62 available for use throughout system 20.

The placing of channels 58 in use or out of use is performed at the reuse-unit level. In other words, whenever base station 22 desires to place a channel 58 in use, it will use a free channel 58 (a non-interfering out-of-use channel 58) in an in-use reuse unit 62 if possible. If no free channel 58 exists, then base station 22 will place a reuse unit 62 in use, from the general pool of reuse units 62 for system 20, to provide the required free channel 58. Conversely, whenever base station 22 places the last in-use channel 58 in reuse unit 62 out of use, then reuse unit 62 is itself placed out of use and returned to the general pool of reuse units 62 for system 20. Those skilled in the art may readily discern that reuse units 62 of other numbers of channels 58, and other reuse schemes, may be used.

Figure 5:
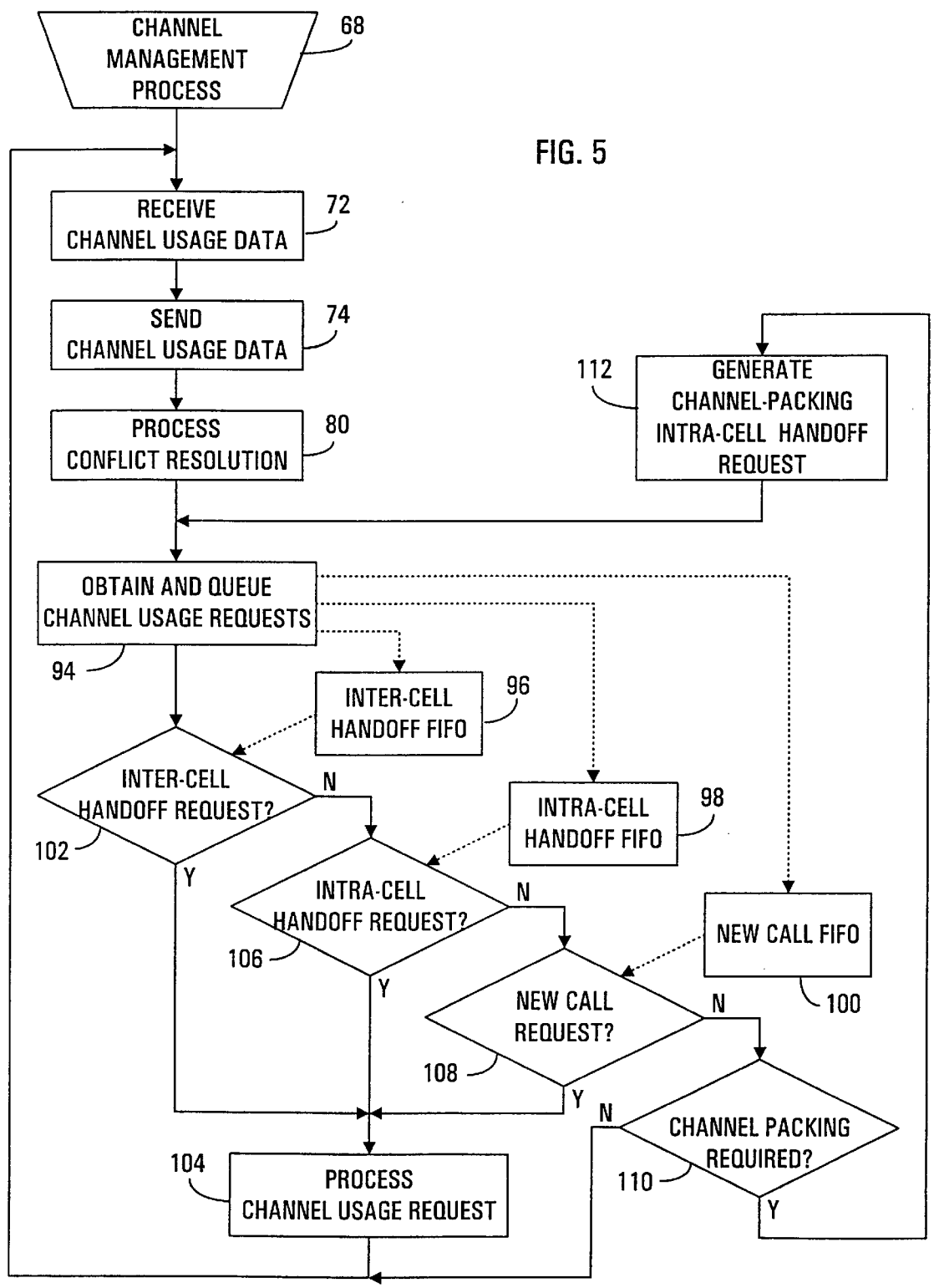
FIG. 5 depicts a flow chart of a process for managing the assignment of communication channels on a real-time basis in accordance with a preferred embodiment of the present invention.

FIG. 5 depicts a flow chart of a process 68 for managing the assignment of communication channels 58 on a real-time basis in accordance with a preferred embodiment of the present invention. FIG. 6 depicts a representational local-group reuse-unit allocation table 70 in accordance with a preferred embodiment of the present invention. Referring to FIGS. 1, 2, 5, and 6, process 68 provides efficient management of communication channel usage and assignments between base stations 22 and subscriber units 26 of system 20. Process 68 is executed in base stations 22 in response to channel usage requests from base stations 22 and subscriber units 26.

A task 72 of process 68 is performed in which parent base station 36 receives reuse unit status data from neighbor base stations 38 in its local group 34. A task 74 is then performed wherein parent base station 36 sends reuse unit status data to each neighbor base station 38 in local group 34. Through tasks 72 and 74, parent base station 36 continuously notifies neighbor base stations 38 of the status of reuse units 62 in use at base station 22, and is kept continuously notified of the status of reuse units 62 in use at each neighbor base station 38 in local group 34 of which base station 22 is the parent. For these purposes, reuse unit status refers to whether reuse units 62 are in use or out of use. Base station 22 coordinates this reuse unit status data by updating allocation table 70. Since every base station 22 is a parent base station 36 of its own local group 34, every base station 22 has the requisite data to keep its allocation table 70 current.

In this embodiment, tasks 72 and 74 maintain table 70 to give the real-time status of all reuse unit 62 assignments made by parent base station 36 and all neighbor base stations 38 within local group 34. In exemplary table 70, at least two primary data are kept, these being a loading index 76 and reuse units data 78. Loading index 76 is effectively the number of in-use reuse units 62 at each base station 22 in local group 34. In the exemplary table 70, empty data cells are shown for reuse units data 78. Each data cell can contain a complex set of data indicating a reuse unit 62 in use and a cell 48 to which it is assigned.

A neighbor base station 38 is determined to have a greater or lesser loading than parent base station 36 as a function of loading index 76. In a parent-neighbor pair of base stations 22, the base station 22 with the higher loading index 76, i.e. with more reuse units 62 assigned, is the base station 22 with the greater loading. This data is used in a conflict resolution process discussed later.

The identification and status of in-use reuse units 62 at base stations 22 of local group 34 allows for greater avoidance of channel allocation conflicts, and facilitates the resolution of conflicts when they do occur.

Those skilled in the art may readily discern that the scheme depicted in FIG. 5 for the monitoring of channel usage in the preferred embodiment is but one of many possible schemes.

Following task 74, a subprocess 80 is performed to process conflict resolution. Subprocess 80 provides for post-assignment conflict resolution. Post-assignment conflict resolution refers to the resolution of channel assignments conflicts after channel(s) 58 have been assigned.

It should be noted that channel assignment conflicts may occur through a number of actions. One such action is through the convergence or divergence of base station cellular footprints 44 and 46 (FIG. 3). Another such action is through the assignment of a conflicting channel 58 to fulfill a handoff request. Regardless of the source of the conflict, a resolution of the conflict mitigates interference.

Figure 7:
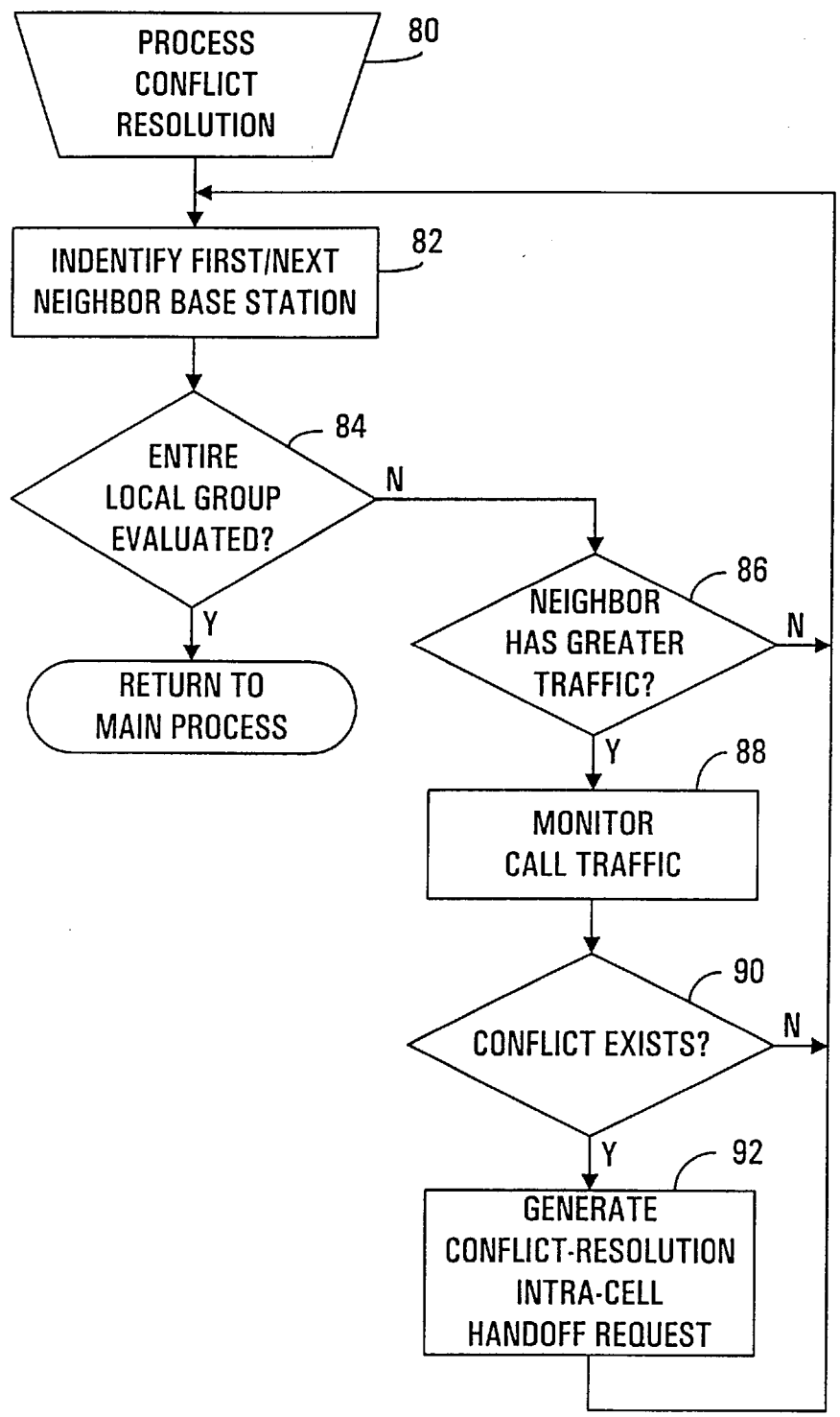
FIG. 7 depicts a flow chart of a subprocess for channel usage conflict resolution in accordance with a preferred embodiment of the present invention.

FIG. 7 depicts a flow chart of subprocess 80 for channel usage conflict resolution in accordance with a preferred embodiment of the present invention. The flow chart depicted in FIG. 7 expands subprocess 80 depicted in FIG. 5.

Subprocess 80 begins with a task 82. Task 82 identifies a first/next neighbor base station 38. During a first iteration of task 82, subprocess 80 identifies and selects the first neighbor base station 38 in table 70. In each subsequent iteration of task 82, subprocess 80 identifies and selects the next neighbor base station 38 in table 70, until all neighbor base stations 38 have been identified, selected, and evaluated.

A decision task 84 then determines if all neighbor base stations 38 in local group 34 have been evaluated by subprocess 80. If all neighbor base stations 38 have been evaluated, subprocess 80 is completed and processing is returned to primary process 68.

If task 84 determines that all neighbor base stations 38 have not been evaluated, then a decision task 86 is performed. Task 86 inspects loading index 76 data of table 70 to determine if the specific neighbor base station 38 selected by task 82 has greater or less call traffic (channel allocations) than parent base station 36. In the exemplary table 70, only neighbor base stations 38 designated "2" and "6" have a greater loading index than parent base station 36. Therefore, those neighbor base stations 38 have greater call traffic than parent base station 36, while all other neighbor base stations 38 have less call traffic.

If neighbor base station 38 has less traffic than parent base station 36, then parent base station 36 refrains from further conflict identification or resolution. The task of identifying whether or not a conflict exists, and providing a resolution if it does, devolves to the base station 22 with the lesser call traffic. Processing loops back to task 82 so the next neighbor base station 38 can be identified and selected.

Since every base station 22 in system 20 is a parent base station 36 of its own local group, subprocess 80, by ensuring that conflict resolution is performed only at the lesser-loaded base station 22 of any neighboring pair of base stations 22, distributes conflict resolution throughout system 20 so that those base stations 22 with the greatest workloads are not further burdened. In any given conflict, two base stations 22 are involved (they conflict with each other). Forcing the lesser-used of every pair of conflicting base stations 22 to provide resolution guarantees that conflict resolution is passed away from those base stations 22 with the greatest workloads. Even if the required conflict resolution were to create a conflict with another (third) base station 22, that conflict, too, will be resolved by the base station 22 with the lesser workload in that new pair of conflicting base stations 22.

Subprocess 80 is configured so that minimal time and overhead are spent by parent base station 36 performing conflict resolution. This maintains efficiency and reduces overhead. With each base station 22 in system 20 so doing, the maintenance of traffic in the entirety of system 20 is substantially optimized.

If task 86 determines that neighbor base station 38 has greater call traffic than parent base station 36, then a task 88 monitors call traffic in both parent base station 36 and neighbor base station 38, through table 70, to determine existing and potential channel assignment conflicts. Through this call traffic monitoring, task 86 is able to tag channels that have certain types of potential (unrealized) conflicts as interfering, thus avoiding severe conflicts through misassignment.

A decision task 90 is then performed to see if a conflict exists between calls. Conflict determination is performed by evaluating reuse units data 78 in table 70 for both parent base station 36 and neighbor base station 38. Evaluation of this data by task 90 will either show a conflict (e.g., interference between calls, proximate cell 48 allocation of the same reuse unit 62, etc.) or no conflict.

If task 90 determines that no conflict exists, then no conflict resolution is required, processing loops back to task 82, and the next neighbor base station 38 is identified and selected.

If task 90 determines that a channel allocation conflict does exist, then a task 92 is performed. Task 92 generates and submits a conflict-resolution intra-cell handoff request. This request, discussed in more detail below, is a channel usage request specific to the resolution of the conflict at hand.

Once task 92 has been performed, processing loops back to task 82 and the next neighbor base station 38 is identified and selected. Through this iterative processing, subprocess 80 examines in turn each neighbor base station 38 of parent base station 36 until all base stations 22 in local group 34 have been examined and all conflicts with greater-used base stations 22 have been resolved.

Referring back to FIGS. 1, 2, and 5, processing proceeds from subprocess 80 to task 94. In task 94, process 68 obtains and queues channel usage requests. These channel usage requests are, in this embodiment, configured as data packets requesting the assignment of a channel 58 to dynamically fulfill call requirements.

In an ongoing background process, readily understood by those skilled in the art, data received which characterizes a channel usage request is evaluated to determine the type of request involved. The types may be characterized to include a conflict-resolution or data-packing intra-cell handoff request, an inter-cell handoff request, or a new call request. A handoff request may be obtained from parent base station 36, a neighbor base station 38 within local group 34, a ground station 28, or a subscriber unit 26. A new call request may be received from a subscriber unit 26 or a ground station 28.

A handoff request is indicative of a need to hand off a call from one channel 58 to another. Since a call in progress has priority over a new call, handoff requests have priority over new call requests.

The generation and submission of a channel usage request comes from creating the proper data packet and the sending of that data packet to the background process of task 94. Task 94 then places the data packet into one of three FIFO (first in, first out) buffers 96, 98, or 100, according to the request type. This segregation of incoming channel usage requests by type leads to a prioritization scheme, which is discussed below. Each FIFO buffer 96, 98, or 100 may contain many channel usage requests prior to processing.

The use of FIFO buffers 96, 98, or 100 forces the sequential processing of each channel usage request of each type, based upon time of reception. Thus all channel usage requests of a given type maintain the same assigned priority.

After task 94, a decision task 102 checks inter-cell handoff request FIFO buffer 96 to see if it contains a channel usage request. If it does, task 102 passes processing to a subprocess 104 to process the inter-cell handoff channel usage request.

If an inter-cell handoff request does not exist (i.e., FIFO buffer 96 is empty), then task 102 passes processing to a decision task 106. Task 106 checks intra-cell handoff request FIFO buffer 98 to see if it contains a channel usage request. If it does, task 106 passes processing to subprocess 104 to process the intra-cell handoff channel usage request.

If an intra-cell handoff request does not exist (i.e., FIFO buffers 96 and 98 are empty), then task 106 passes processing to task 108. Task 108 checks new call request FIFO buffer 100 to see if it contains a channel usage request. If it does, task 108 passes processing to subprocess 104 to process the new call channel usage request.

Tasks 102, 106, and 108 prioritize channel usage requests. An inter-cell handoff request is priority one, and is processed before other types of channel usage requests. An intra-cell handoff request is priority two, and is processed after inter-cell handoff requests have been processed, but before new call requests are processed. A new call request is priority three, and is processed after inter-cell handoff requests and intra-cell handoff requests have been processed.

If a new call request does not exist (FIFO buffers 96, 98, and 100 are all empty), then task 108 passes processing to a decision task 110 to determine whether channel packing is required. Channel packing is an internal housekeeping function in which channels 58 are handed off between reuse units 62 (FIG. 4). Desirably, channels 58 are handed off from lesser-used reuse units 62 to greater-used reuse units 62. This is done so that lesser-used reuse units 62 may be placed out of use. Thus, those lesser-used reuse units 62 placed out of use become available to system 20 as a whole. This decreases the number of in-use reuse units 62 at parent base station 36, which decreases the likelihood of conflict with neighbor base stations 38.

If task 110 determines that channel packing is not required at this time, then processing loops back to task 72 and process 68 reiterates tasks 72 and 74, subprocess 80, and tasks 94, 102, 106, 108, and 110 until either a channel usage request is received or channel packing is required.

If task 110 determines that channel packing is required, then a task 112 generates and submits one or more channel-packing intra-cell handoff requests. The intra-cell handoff request generated by task 112 differs from a conflict resolution intra-cell handoff request generated by task 92 (FIG. 7) in that it fulfills an internal housekeeping function of parent base station 36 rather than a call-maintenance function.

Once task 112 has been performed, processing loops back to task 94. In the upcoming iteration of process 68, task 106 will find the intra-cell handoff request generated by task 112 and dispatch it to subprocess 104.

Figure 8:
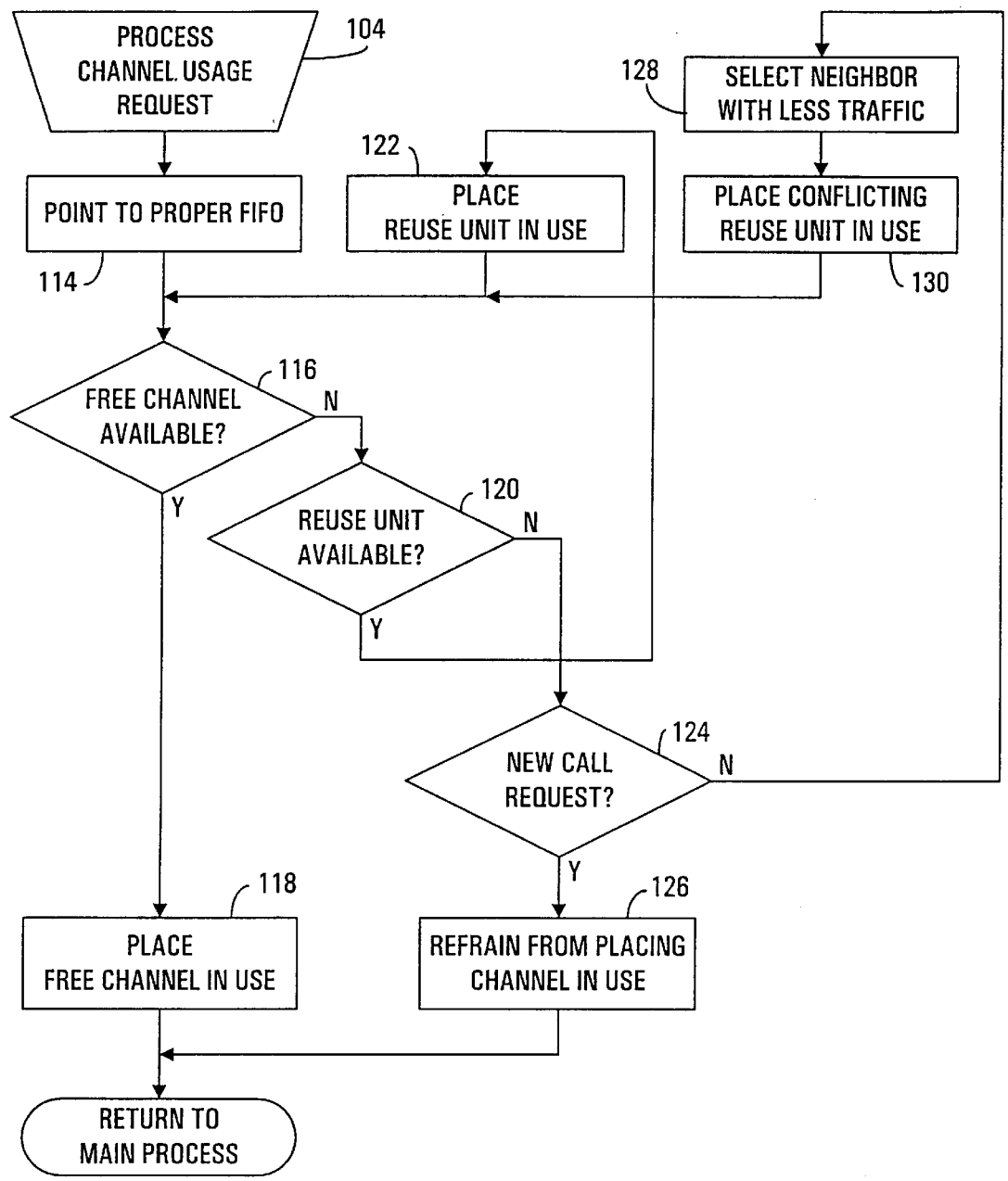
FIG. 8 depicts a flow chart of a subprocess for assigning communication channels in response to channel usage requests in accordance with a preferred embodiment of the present invention.

FIG. 8 depicts a flow chart of subprocess 104. Subprocess 104 assigns communication channels 58 in response to channel usage requests in accordance with a preferred embodiment of the present invention. The flow chart depicted in FIG. 8 expands on subprocess 104 depicted in FIG. 5.

Referring to FIGS. 4 and 5, a task 114 is performed wherein subprocess 104 receives and maintains a pointer to the FIFO buffer 96, 98, or 100 containing the channel usage request to be processed. This pointer, passed to subprocess 104 from parent process 68, allows subprocess 104 to always knows which type of channel usage request is being processed.

A decision task 116 is then performed to determine if a free channel is available. In task 116, parent base station 36 checks allocation table 70 (FIG. 6) to determine if any of its in-use reuse units 62 contains a non-interfering out-of-use channel 58.

If task 116 determines that a free channel 58 is available, then a task 118 places that free channel 58 in use. During task 118, a channel allocation request is retrieved from the pointed-to FIFO buffer 96, 98, or 100, the designated free channel 58 is placed in use, the call being serviced begins or continues using the newly placed-in-use channel 58, and processing returns to primary process 68. Since a free channel 58 is available, parent base station 36 can refrain from further checking and can assign that free channel 58 regardless of the type of channel usage request involved.

If task 116 determines that no free channel 58 is available, then a decision task 120 determines if a reuse unit 62 is available. In task 120, parent base station 36 checks allocation table 70 to determine if any out-of-use reuse units 62 are available from the general pool of reuse units 62 in system 20.

If task 120 determines that an out-of-use reuse unit 62 is available, then a task 122 places that reuse unit 62 in use and processing loops back to task 116. In most cases, at least one channel 58 in the newly placed-in-use reuse unit 62 will be free, and task 116 readily finds an available free channel 58.

Should none of the channels 58 of the newly placed-in-use reuse unit 62 be free, task 116 will pass processing to task 120, which will check for another out-of-use reuse unit 62. This process will iterate until either a reuse unit 62 containing a free channel 58 is placed in use or task 120 determines that there are no available out-of-use reuse units 62. In-use reuse units 62 with all channels 58 out of use, whether free or not, are placed out of use as a part of a background process (not shown).

Tasks 116 and 120 constitute a pre-usage interference conflict check. That is, if task 112 found a free channel 58, then no channel-assignment conflict exists and that free channel 58 is placed in use. Likewise, if task 120 found a not-in-use reuse unit 62 containing a free channel 58, then no channel-assignment conflict exists and that free channel 58 is placed in use. Only if task 116 was unable to find a free channel 58 and task 120 was unable to find an out-of-use reuse unit 62 containing a free channel 58 can a conflict exist. In that case, a decision task 124 is performed.

Task 124 determines if FIFO buffer 100 is the buffer pointed to. If FIFO buffer 100 is the pointed-to buffer, then the channel usage request being processed is a new call request. In this case, a task 126 refrains from assigning a channel 58. Therefore, channel 58 is assigned to a new call only if that assignment would not result in a channel assignment conflict. New call requests have the lowest priority of any channel usage request, based upon the assumption that it is better to properly service existing calls than to unnecessarily deteriorate existing call service to initiate new calls. In other words, it is better to make a new caller wait briefly, or even receive a busy signal, than it is to unnecessarily risk disconnecting a call already in progress.

Besides refraining from allocating a channel 58, task 126 may optionally refrain from removing the new call request from FIFO buffer 100. If the new call request is left in FIFO buffer 100, then processing can return to primary process 68, with the new call request intact, ready to try again next time. Of course, those experienced in the art will readily recognize that several different schemes (e.g., timeout, iteration counting, etc.) may be implemented to prevent the development of an infinite loop in which a new call request would never be processed.

If task 124 determines that FIFO buffer 96 or 98 is the pointed-to buffer, and that the channel usage request is either an inter-cell or an intra-cell handoff request, a task 128 is performed. In task 128, parent base station 36 selects a neighbor base station 38 within local group 34 that, according to table 70, has less call traffic than parent base station 36. Ideally, the neighbor base station 38 selected would be that with the least call traffic (the least loaded), but as those skilled in the art may readily perceive, this is not required.

Once task 128 has selected a neighbor base station 38 with less call traffic, then a task 130 places a reuse unit 62 in use at parent base station 36 that creates a conflict with the selected neighbor base station 38. After task 130 has placed in use a conflicting reuse unit 62, processing loops back to task 116 and continues as already described, ultimately returning to primary process 68. A channel 58 from this conflicting reuse unit 62 will be placed in use at task 118.

Upon completion of subprocess 104, process control returns to primary process 68 in FIG. 5, and loops back to task 72, making process 68 continuously iterative.

As discussed above, all base stations 22 in system 20 are parent base stations 36 of their own local groups 34. Because of this, all base stations 22 in system 20 are continuously and concurrently performing process 68, and subprocesses 80 and 104. In the scheme used in this embodiment, no call is handed off between base stations 22 to address conflicts. Calls are always accepted by the base station 22 receiving the request, and it is the resolution of a conflict that is handed off to a lesser-loaded base station 22 in pairs of conflicting base stations 22. In this manner, those base stations 22 with greater workloads are protected from unnecessary increases in their workloads to resolve conflicts. At the same time, those base stations 22 with lesser workloads are obliged to resolve conflicts which, because of their lesser workloads, they are better equipped to do, and, because of their lighter traffic load, are more likely to successfully achieve.

In summary, channel management process 68, together with its tasks and subprocesses, allocates a non-conflicting (free) channel 58 to a parent base station 36 in response to a channel usage request if possible. If a non-conflicting channel 58 cannot be allocated, then a conflicting channel 58 is allocated if and only if the channel usage request is either an inter-cell or an intra-cell handoff request. It does not allocate a conflicting channel 58 if the channel usage request is a new call request. In the event of channel assignment conflicts between base stations 22, the conflict is resolved in the base station 22 that has the lesser loading.

Although the preferred embodiments of the invention have been illustrated and described in detail, it will be readily apparent to those skilled in the art that these embodiments include processes that have a wide variety of tasks sequenced in a wide variety of patterns to achieve results equivalent to those described herein. In addition, those skilled in the art will understand that the present invention is not limited to satellite cellular systems, and that various modifications may be made therein without departing from the spirit of the invention or from the scope of the appended claims.

What is claimed is:

1. A method for managing channel usage at a first base station in a radio telecommunication system, said method comprising the steps of:

(a) receiving data which identify channels in use at a second base station;

(b) obtaining a channel usage request, said channel usage request requesting use of a channel at said first base station;

(c) determining whether said second base station is carrying less call traffic than said first base station; and (d) if said second base station is carrying less call traffic, using a channel at said first base station which is in use at said second base station.

2. A method as claimed in claim 1, wherein said step (b) obtains a plurality of channel usage requests, and said method additionally comprises the steps of:

sequentially processing said channel usage requests by performing said step (c) and said step (d) for each of said channel usage requests; and prioritizing said channel usage requests to indicate an order in which to sequentially process said channel usage requests.

3. A method as claimed in claim 2, wherein:

said method additionally comprises the step of evaluating data which characterize said channel usage requests as inter-cell handoff requests and intra-cell handoff requests; and said prioritizing step gives priority to processing said inter-cell handoff requests before processing said intra-cell handoff requests.

4. A method as claimed in claim 3, wherein:

said evaluating step evaluates data which characterize said channel usage requests as inter-cell handoff requests, intra-cell handoff requests, and new call requests; and said prioritizing step gives priority to processing said inter-cell handoff requests and said intra-cell handoff requests before processing said new call requests.

5. A method as claimed in claim 2, wherein:

said method additionally comprises the step of evaluating data which characterize said channel usage requests as handoff requests and new call requests; and said prioritizing step gives priority to processing said handoff requests before processing said new call requests.

6. A method as claimed in claim 5, wherein:

said step (d) uses channels at said first base station which are in use at said second base station in response to said handoff requests; and said step (d) refrains from using channels at said first base station which are in use at said second base station in response to said new call requests.

7. A method as claimed in claim 1, additionally comprising the step of refraining, at said first base station, from determining a presence of or resolving interference conflicts between channels in use at said first and second base stations when said second base station is carrying less call traffic than said first base station.

8. A method as claimed in claim 1, additionally comprising the step of determining, if said second base station is carrying more call traffic than said first base station, whether a conflict exists between a first existing call using a first base station channel and a second existing call using a second base station channel.

9. A method as claimed in claim 8, additionally comprising the step of handing off, if said conflict exists, said first call to a first base station channel which does not conflict with channels in use at said second base station.

10. A method as claimed in claim 1, additionally comprising the step of identifying whether a non-interfering channel is available for use at said first base station, said non-interfering channel being a first base station channel which does not interfere with channels in use at said first base station and does not interfere with channels in use at said second base station.

11. A method as claimed in claim 10, wherein said step (d) uses said non-interfering channel at said first base station when said non-interfering channel is available for use at said first base station.

12. A method as claimed in claim 1, additionally comprising the step of sending data from said first base station to said second base station, said data being configured to identify said channel used at said first base station.

13. A method as claimed in claim 1, additionally comprising the step of placing said first base station in a moving orbit around the earth.

14. A method as claimed in claim 1, wherein:

said first base station manages a first plurality of channels, including said channel used in said step (d);

said first plurality of channels are grouped into reuse units;

each of said reuse units includes a second plurality of said channels;

each reuse unit is placed in use when any channel included therein is placed in use and is placed out of use when all channels included therein are placed out of use; and said method additionally comprises the step of handing off a call from a first one of said reuse units to a second one of said reuse units to place said first one of said reuse units out of service.

15. A method for managing radio channel usage among a plurality of base stations in a radio telecommunication system, said method comprising the steps of:

placing channels in use at each of said base stations to support calls from each of said base stations;

notifying other ones of said base stations that said channels have been placed in use;

monitoring, at each of said base stations, call traffic in more than one of said base stations; and identifying possible interference conflicts between channels placed in use at pairs of said base stations;

wherein, for each pair of said base stations, said identifying step is performed at said base station which is experiencing less call traffic within said pair of base stations.

16. A method as claimed in claim 15, additionally comprising, for each pair of said base stations, the step of placing in use, at said base station which is experiencing more call traffic within said pair of said base stations, a channel which interferes with a channel already placed in use at said base station which is experiencing less call traffic within said pair of said base stations.

17. A method as claimed in claim 15, wherein said placing step places channels in use in response to channel usage requests, said requests being configured as handoff requests and new call requests, and said method additionally comprises the steps of:

sequentially processing, at each of said base stations, said channel usage requests; and prioritizing said channel usage requests to process said handoff requests before processing said new call requests.

18. A method as claimed in claim 15, wherein said placing step places channels in use in response to channel usage requests, said requests being configured as handoff requests and new call requests, and said placing step comprises the steps of:

selecting, at said base station which is experiencing more call traffic within said pair of said base stations, channels which interfere with channels already placed in use at said base station which is experiencing less call traffic within said pair of said base stations, said selecting step being performed in response to said handoff requests; and refraining, at said base station which is experiencing more call traffic within said pair of said base stations, from placing into use channels which interfere with channels already placed in use at said base station which is experiencing less call traffic within said pair of said base stations, said refraining step being performed in response to said new call requests.

19. A method as claimed in claim 15, additionally comprising the step of refraining, at said base station which is experiencing more call traffic within said pair of said base stations, from performing said identifying step.

20. A method as claimed in claim 15, additionally comprising the step of performing an intra-cell handoff at said base station which is experiencing less call traffic within said pair of said base stations to resolve conflicts identified in said identifying step.

21. A method as claimed in claim 15, wherein:

channels supported by each of said base stations are grouped into reuse units;

each reuse unit is placed in use when any channel included therein is placed in use and is placed out of use when all channels included therein are placed out of use; and said method additionally comprises the step of performing, at each of said base stations, an intra-cell handoff between two of said reuse units to place one of said two reuse units out of service.

22. A method for managing radio channel usage between first and second base stations within a radio telecommunication system, said first and second base stations supporting first and second cells, respectively, and said first cell being located proximate said second cell so that communications in said first and second cells potentially interfere, said method comprising the steps of:

(a) receiving channel usage requests at said first and second base stations, said channel usage requests requesting use of channels at said first and second base stations, and said requests being configured as handoff requests and new call requests;

(b) performing pre-usage interference conflict checking at said first and second base stations in response to each of said channel usage requests;

(c) monitoring call traffic at said first and second base stations to identify a greater call-traffic-carrying one of said first and second base stations and a lesser call-traffic-carrying one of said first and second base stations;

(d) if, in response to said step (b), channels appear to be non-interfering, using said apparently non-interfering channels at said greater and lesser call-traffic-carrying base stations to support calls conducted in said first and second cells;

(e) if, in response to said step (b), no channel appears to be non-interfering, refraining from using any channel in response to new call requests at said greater and lesser call-traffic-carrying base stations; and (f) if, in response to said step (b), no channel appears to be non-interfering, using apparently interfering channels at said greater call-traffic-carrying base station to support calls conducted in said first cell.

23. A method as claimed in claim 22, additionally comprising the steps of:

(g) notifying said second base station of channels placed in use and removed from use at said first base station;

(h) notifying said first base station of channels placed in use and removed from use at said second base station; and (i) performing usage interference conflict checking at said lesser call-traffic-carrying base station, said step (i) being performed with respect to channels placed in use at said first and second base stations.

24. A method as claimed in claim 23, additionally comprising the step of:

(j) if said step (i) identifies a usage interference conflict at said lesser call-traffic-carrying base station, performing an intra-cell handoff at said lesser call-traffic-carrying base station to resolve said usage interference conflict.

25. A system comprising:

a plurality of neighbor base stations, each carrying an amount of call traffic; and a parent base station that is capable of communicating with each of the neighbor base stations to receive the amount of call traffic from each of the neighbor base stations, passing conflict resolution to a neighbor base station if the neighbor base station has a lesser amount of the call traffic than the parent base station, and resolving a conflict if the neighbor base station has a greater amount of the call traffic and the conflict exists.

26. A parent base station comprising:

means for communicating with each of the neighbor base stations to receive an amount of call traffic of each of a plurality of neighbor base stations;

means for passing conflict resolution to a neighbor base station if the neighbor base station has a lesser amount of the call traffic than the parent base station; and means for resolving a conflict if the neighbor base station has a greater amount of the call traffic than the parent base station and the conflict exists.

* * * * *